United States Patent
Kwatra et al.

(10) Patent No.: US 11,442,457 B2
(45) Date of Patent: Sep. 13, 2022

(54) NAVIGATION VIA PREDICTIVE TASK SCHEDULING INTERRUPTION FOR AUTONOMOUS VEHICLES

(71) Applicant: INTERNATIONAL BUSINESS MACHINES CORPORATION, Armonk, NY (US)

(72) Inventors: Shikhar Kwatra, Durham, NC (US); Florian Pinel, New York, NY (US); Jeremy R. Fox, Georgetown, TX (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 16/202,154

(22) Filed: Nov. 28, 2018

(65) Prior Publication Data

US 2020/0166942 A1 May 28, 2020

(51) Int. Cl.
*G05D 1/02* (2020.01)
*G06F 9/48* (2006.01)
*G06N 3/08* (2006.01)
*G05D 1/00* (2006.01)

(52) U.S. Cl.
CPC ......... *G05D 1/0221* (2013.01); *G05D 1/0088* (2013.01); *G06F 9/4881* (2013.01); *G06N 3/08* (2013.01); *G05D 2201/0213* (2013.01)

(58) Field of Classification Search
CPC .............. G05D 1/0221; G05D 1/0088; G05D 2201/0213; G06F 9/4881; G06N 3/08; G06N 3/0445; G01C 21/3617; G01C 21/3484; G01C 21/3641; G01C 21/3611;
(Continued)

(56) References Cited

U.S. PATENT DOCUMENTS

| 6,915,283 B2 * | 7/2005 | Tani ..................... G05B 13/027 706/30 |
| 10,065,517 B1 * | 9/2018 | Konrardy .................. B60P 3/12 |
| 2012/0303397 A1 | 11/2012 | Prosser |

(Continued)

FOREIGN PATENT DOCUMENTS

CN    109213141 A  *  1/2019  ............. B60L 53/00

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Nga X Nguyen
(74) *Attorney, Agent, or Firm* — Jordan T. Schiller

(57) ABSTRACT

According to one embodiment, a method, computer system, and computer program product for navigating driverless vehicles is provided. The present invention may include ingesting data pertaining to the operation of the driverless vehicle, utilizing that data to predict tasks, which are driverless vehicle service tasks such as parking, maintenance, fueling, et cetera. The invention may further include determining the risk that a user may have need of the driverless vehicle, and scheduling the tasks to provide a balanced combination of convenience to the user, effective maintenance of the driverless vehicle, cost, and time. The method further includes navigating the driverless vehicle to accomplish the scheduled tasks.

18 Claims, 5 Drawing Sheets

(58) Field of Classification Search
CPC .............. G01C 21/362; G01C 21/3661; G01C 21/3667
See application file for complete search history.

(56) References Cited

U.S. PATENT DOCUMENTS

| | | | | |
|---|---|---|---|---|
| 2015/0345962 | A1* | 12/2015 | Graham | G06Q 10/047 |
| | | | | 701/423 |
| 2015/0348335 | A1 | 12/2015 | Ramanujam | |
| 2016/0364823 | A1* | 12/2016 | Cao | G06Q 50/30 |
| 2017/0361462 | A1* | 12/2017 | Chelian | B25J 13/006 |
| 2017/0364869 | A1 | 12/2017 | Tarte et al. | |
| 2018/0017404 | A1* | 1/2018 | Mendels | G01C 21/3641 |
| 2019/0232974 | A1* | 8/2019 | Reiley | G06V 20/597 |

OTHER PUBLICATIONS

DESCARTES™, "Route Execution", Vehicle Fleet Management Systems, Routing and Scheduling, printed Sep. 27, 2018, pp. 1-6, https://www.descartes.com/solutions/routing-mobile-telematics/route-execution.

Lam et al., "Autonomous Vehicle Public Transportation System: Scheduling and Admission Control", Preliminary version of this paper was presented in Proceedings of the 3rd International Conference on Connected Vehicles and Exposition, Nov. 2014, arXiv:1502.07242v2, Sep. 20, 2015, pp. 1-16.

Pinel et al., Pending U.S. Appl. No. 15/812,352, filed Nov. 14, 2017, entitled: "Parking Availability Predictor", pp. 1-43.

* cited by examiner

NAVIGATION VIA PREDICTIVE TASK SCHEDULING INTERRUPTION FOR AUTONOMOUS VEHICLES

BACKGROUND

The present invention relates, generally, to the field of computing, and more particularly to driverless vehicle navigation.

In recent years, advances in computer vision, navigation, and computing have made possible driverless vehicles capable of carrying passengers through public streets. While these vehicles have not yet replaced human drivers, the obvious advantageous and the amount of industry attention and funding accorded to research and development of driverless vehicles demonstrates that they could be a real and growing component of the transportation landscape in the very near future. However, there exists a need to develop technologies to utilize the potential advantages of driverless vehicles to the fullest reasonable extent.

SUMMARY

According to one embodiment, a method, computer system, and computer program product for navigating driverless vehicles is provided. The present invention may include ingesting data pertaining to the operation of the driverless vehicle, utilizing that data to predict tasks, which are driverless vehicle service tasks such as parking, maintenance, fueling, et cetera. The invention may further include determining the risk that a user may have need of the driverless vehicle, and scheduling the tasks to provide a balanced combination of convenience to the user, effective maintenance of the driverless vehicle, cost, and time. The method further includes navigating the driverless vehicle to accomplish the scheduled tasks.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
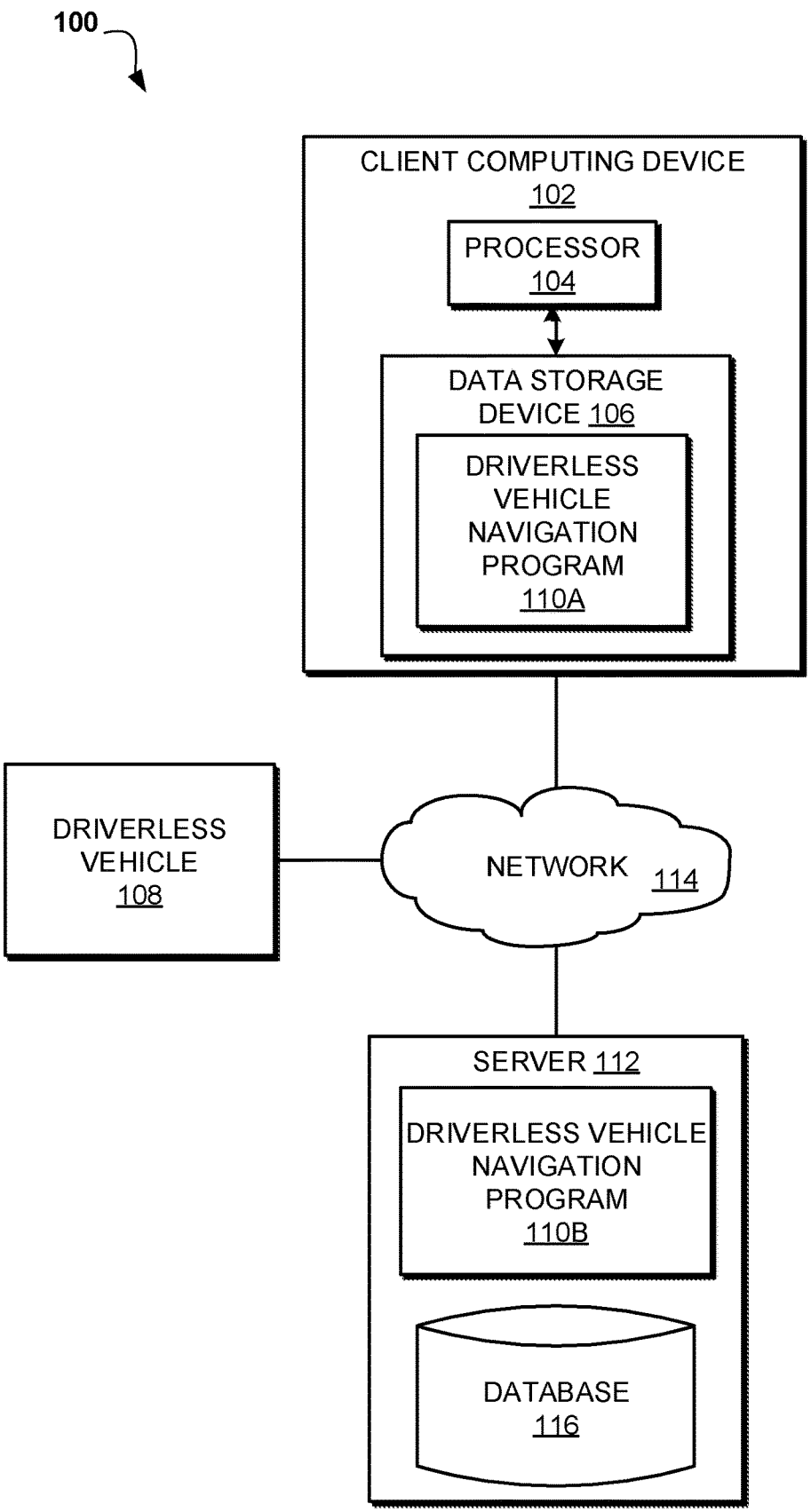
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to driverless vehicle navigation. The following described exemplary embodiments provide a system, method, and program product to, among other things, schedule and execute tasks for a driverless vehicle, such as charging and maintenance, during intervals when a user is least likely to have need of the driverless vehicle. Therefore, the present embodiment has the capacity to improve the technical field of driverless vehicle navigation by allowing driverless vehicles to automatically perform tasks to maintain themselves without requiring the presence of a user, and ensuring that the driverless vehicle remains available when the user desires to use it.

As previously described, in recent years, advances in computer vision, navigation, and computing have made possible driverless vehicles capable of carrying passengers through public streets. While these vehicles have not yet replaced human drivers, the obvious advantageous and the amount of industry attention and funding accorded to research and development of driverless vehicles demonstrates that they could be a real and growing component of the transportation landscape in the very near future. However, there exists a need to develop technologies to utilize the potential advantages of driverless vehicles to the fullest reasonable extent.

With the emergence of fleets of self-driving vehicles allowing individuals to order rides as needed, car manufacturers and car rental companies will have to work harder to convince consumers to buy or rent a car; it will make little sense for a consumer to have to deal with all the hassles of car ownership (refueling, recharging, maintenance, parking) if car services provide an affordable alternative. Furthermore, driverless vehicles spend a great deal of time idle whenever their owner does not need to be transported. As such, it may be advantageous to, among other things, implement a system that analyzes a user's schedule and various other factors in order to predict times when a user is least likely to require the use of her car, and automatically schedules and executes car-related tasks such as refueling/recharging, maintenance, repairs, et cetera during these periods.

According to one embodiment, the invention is a method of navigating a driverless vehicle to automatically perform various vehicle-related tasks, by ingesting data pertaining to the operation of the driverless car, and utilizing that data to predict tasks, which are driverless vehicle service tasks such as parking, maintenance, fueling, et cetera. The method further calculates the risk that a user may have need of the driverless vehicle, and then schedules the tasks at a beneficial combination of convenience to the user, effective maintenance of the driverless vehicle, cost, and time. The method then involves navigating the driverless vehicle to accomplish the scheduled tasks.

An exemplary use case of an embodiment of the method, wherein the method is implemented in the form of a software program executed by a processor within a driverless vehicle, may proceed as follows:

The driverless vehicle arrives at the user's business parking destination to deliver the user to the user's place of business. The user informs the driverless vehicle when the driver intends to use the vehicle once again.

The program engages in predicting tasks, such as vehicle fueling, maintenance, or any other types of task that the user would like their vehicle to complete while the user is at their business location. The program assesses the vehicle's history, diagnostics, and user notes to predict repair or maintenance tasks, and predicts when the driverless vehicle will require refueling based on the car's current and past fuel consumption, user schedule, and current fuel levels. The program identifies a need for maintenance and refueling, and adds these as tasks.

The program then monitors the user's schedule to find availability for scheduling the tasks. Upon finding a window, the program determines when to leave the home or business parking location. The program calculates a buffer time prior to arriving at and returning from the tasks in order to protect the user's schedule, and minimize risk to schedule impact; protect against the vehicle getting trapped in traffic congestion; protect the vehicle from adverse/extreme weather events; and allow enough time to complete the planned tasks and return on time if the tasks take longer than planned. Upon calculating a buffer time, the driverless vehicle departs to execute the tasks at the planned time.

The vehicle executes the tasks on time, and returns to the spot from which it departed, although its previous spot is now occupied. The program compares parking and energy costs to pick a best parking location, and determines that driving around the block and double parking on a quiet street is cheaper than parking at a parking meter. The user leaves her business location at the end of the day to find the driverless vehicle awaiting her, refueled, serviced, and ready to go.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to schedule and execute tasks for a driverless vehicle, such as charging and maintenance, during intervals when a user is least likely to have need of the driverless vehicle.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a driverless vehicle navigation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a driverless vehicle navigation program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Driverless vehicle 108 may be a vehicle capable of sensing its environment and navigating public road infrastructure with little to no human input. Driverless vehicle 108 may contain a processor capable of running programs such as driverless vehicle navigation program 110A, 110B, or may be capable of receiving inputs from a processor connected to network 114, such as client computing device 102 or server 112. Driverless vehicle 108 may be powered by conventional fuels, batteries, or any other power source.

According to the present embodiment, the driverless vehicle navigation program 110A, 110B may be a program enabled to schedule and execute tasks for a driverless vehicle, such as charging and maintenance, during intervals when a user is least likely to have need of the driverless vehicle. The driverless vehicle navigation program 110A, 110B may be located on client computing device 102 or server 112 or on any other computing device located within network 114, including driverless vehicle 108. Furthermore, driverless vehicle navigation program 110A, 110B may be distributed in its operation over multiple devices, such as client computing device 102, server 112, and driverless vehicle 108. The driverless vehicle navigation method is explained in further detail below with respect to FIG. 2.

Figure 2:
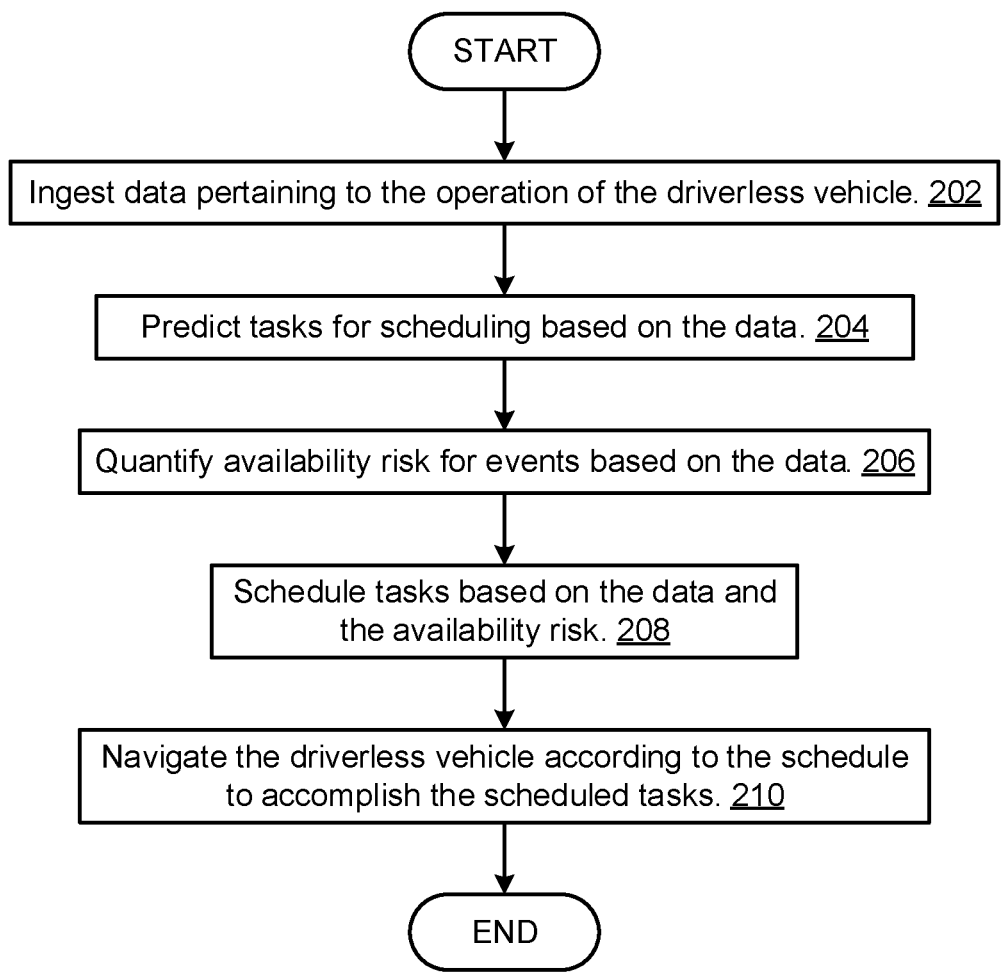
FIG. 2 is an operational flowchart illustrating a driverless vehicle navigation process according to at least one embodiment.

Referring now to FIG. 2, an operational flowchart illustrating a driverless vehicle navigation process 200 is depicted according to at least one embodiment. At 202, the driverless vehicle navigation program 110A, 110B ingests data pertaining to the operation of the driverless vehicle. This data may include user data, driverless vehicle data, and environmental data. User data may be any data that pertains to the social/work habits, preferences, location, and anything else that may assist driverless vehicle navigation program 110A, 110B in predicting when to schedule tasks to minimize inconvenience to the user. User data may include the user's work and personal calendars, travel itineraries, and key pieces of location data. In some embodiments, the user's location may be gathered from driverless vehicle navigation systems, mobile apps, wearable devices, beacons, mobile device location monitoring, et cetera. User data may also include user's preferences or feedback, which may be gathered by prompting the user or otherwise soliciting user input. User preferences that driverless vehicle navigation program 110A, 110B may prompt for may include how much a user desires that a driverless vehicle be available for use at a given time, desired distance or cost thresholds for parking, frequency with which a user desires maintenance or recharging for the driverless vehicle, et cetera. User data may further include past preferences, feedback, location data, calendars, et cetera, which may be used to refine future judgements by driverless vehicle navigation program 110A, 110B.

Driverless vehicle data may include data pertaining to the operation of the driverless vehicle. For instance, driverless vehicle data may include the make, model, fuel capacity, distance per charge/tank, age, and other characteristics of the driverless vehicle, as well as a record of each time and location where driverless vehicle was charged/fueled, as well as the general location of the driverless vehicle with relation to the user at the time it was charged/fueled (for instance, home, work, favorite restaurant, local pub, et cetera). Driverless vehicle data may also include maintenance records, locations where the driverless vehicle was repaired or maintained, current diagnosed or potential operational issues with the driverless vehicle, et cetera.

Environmental data may include data pertaining to the environment within which the driverless vehicle will be or has been operating. Environmental data may include traffic or weather conditions at a given time and place, location, cost, and availability of fueling, maintenance, repair, or parking services, location of accidents, et cetera. Environmental data may further include historical data pertaining to road conditions, to better predict road conditions in planning routes.

At 204, driverless vehicle navigation program 110A, 110B predicts tasks for scheduling based on the data. The driverless vehicle navigation program 110A, 110B may predict when tasks should be scheduled by utilizing a data normalization function to generate a normalized time-based location matrix of the user's planned destinations from the data, including configured document sources and real-time GPS location data. The output from this normalization function may provide location matrix data that becomes feature input into a recurrent neural network (RNN) to predict the next fueling time and location based on the battery/tank threshold of the driverless vehicle. The RNN may further be trained with location matrix data to improve vehicle location inference and prediction. The driverless vehicle navigation program 110A, 110B may further predict whether service will be necessary from service records of similar vehicles, mileage from the driverless vehicle, diagnostic checks of the driverless vehicle, et cetera. Tasks may also be requested by the user.

At 206, driverless vehicle navigation program 110A, 110B quantifies availability risk for events based on the data. Availability risk may be the likelihood that the driverless vehicle will be needed by the user at any given time. For instance, availability risk might be low in the middle of the night while the user is sleeping, or in the morning just after the user has gotten to work, since in each case the user is unlikely to need to use the vehicle. The driverless vehicle navigation program 110A, 110B may, for instance, use user data such as user location and the activity that the user is engaged in at a given time, and the frequency with which a user has had need of the vehicle during that activity, as well as user preferences regarding whether the driverless vehicle should be available during that activity, in order to determine the likelihood that the user will need the driverless vehicle during that activity. The driverless vehicle navigation program 110A, 110B may also prompt the user for information regarding when the user expects to use the vehicle again. Events may be any discrete period of time while the user is engaged in a task, or even one or more tasks, such as a dentist appointment, work, a party, evening free time, sleeping time, et cetera. The driverless vehicle navigation program 110A, 110B may determine an availability risk for each event on a user's schedule, or may predict, based on schedule items and driverless vehicle data, the window within which the driverless vehicle will require servicing or refueling, and determine availability risk during scheduled events within that window. Where specific schedule items are missing or unavailable, driverless vehicle navigation program 110A, 110B may infer user events from past trends. For instance, if a user always drives to a fencing class on Wednesdays from 5:30-6:30, the driverless vehicle navigation program 110A, 110B may infer that such time is a recurring unscheduled event from the location of the user and past location data of the driverless vehicle at 5:30-6:30. The driverless vehicle navigation program 110A, 110B may tag this event as a social event based on the destination, which is a fencing studio. The driverless vehicle navigation program 110A, 110B may take into account historical data showing that the user has not used the driverless vehicle in the past during this time period, and the inference that the user very rarely misses social activities, and accordingly set the availability risk during this event to 10%.

At 208, driverless vehicle navigation program 110A, 110B schedules tasks based on the data and the availability risk. The driverless vehicle navigation program 110A, 110B may utilize trade-off analysis to balance availability risk, available time, and cost, and select the best time and location for performing each task in order to select a time that effectively combines convenience to the user, effective maintenance of the driverless vehicle, cost, and time. The driverless vehicle navigation program 110A, 110B may schedule tasks in order of when they must be completed, or in order of the potential severity of the consequences of skipping them. The driverless vehicle navigation program 110A, 110B may also prioritize certain tasks at the explicit behest of the user, or infer the user's wishes from user preferences or past data. The driverless vehicle navigation program 110A, 110B, in scheduling a task, may add in some buffer time before the driverless vehicle departs to complete the task and/or after the task is completed, to account for travel time and to ensure that the driverless vehicle will have completed the task on time and returned before the driverless vehicle is again needed by the user. The driverless vehicle navigation program 110A, 110B may formulate this buffer time based on environmental data, including traffic and weather data, to plot an efficient course for the driverless vehicle and to ensure that regardless of road conditions the driverless vehicle completes its task and returns in a timely fashion. The driverless vehicle navigation program 110A, 110B may further take into account the risk that a task may take longer to complete than planned in scheduling tasks; for instance, while an oil change may reliably be completed in a consistent amount of time, more delicate operations may exceed the expected completion time by an unpredictable amount. As such, for more complicated operations, driverless vehicle navigation program 110A, 110B may add in additional buffer time to absorb delayed completion of tasks.

At 210, driverless vehicle navigation program 110A, 110B navigates the driverless vehicle according to the schedule to accomplish the scheduled tasks. The driverless vehicle navigation program 110A, 110B may be integrated with driverless vehicle navigation software to pilot the driverless vehicle remotely over network 114, or may be installed within the driverless vehicle. In other embodiments, driverless vehicle navigation program 110A, 110B may direct a driverless vehicle navigation program to navigate to the location of the task based on the schedule.

It may be appreciated that FIG. 2 provides only an illustration of one implementation and does not imply any limitations with regard to how different embodiments may be implemented. Many modifications to the depicted environments may be made based on design and implementation requirements. For instance, in some embodiments of the invention, driverless vehicle navigation program 110A, 110B may keep a feedback store, where driverless vehicle navigation program 110A, 110B stores the results of scheduled tasks as well as user feedback, which the program may use to assess and refine the accuracy of future availability risk calculation, as well as task predicting and scheduling. Furthermore, in embodiments where the task includes parking the car, driverless vehicle navigation program 110A, 110B may compare parking and energy costs to pick a best parking location when arriving at or returning from a task.

Figure 3:
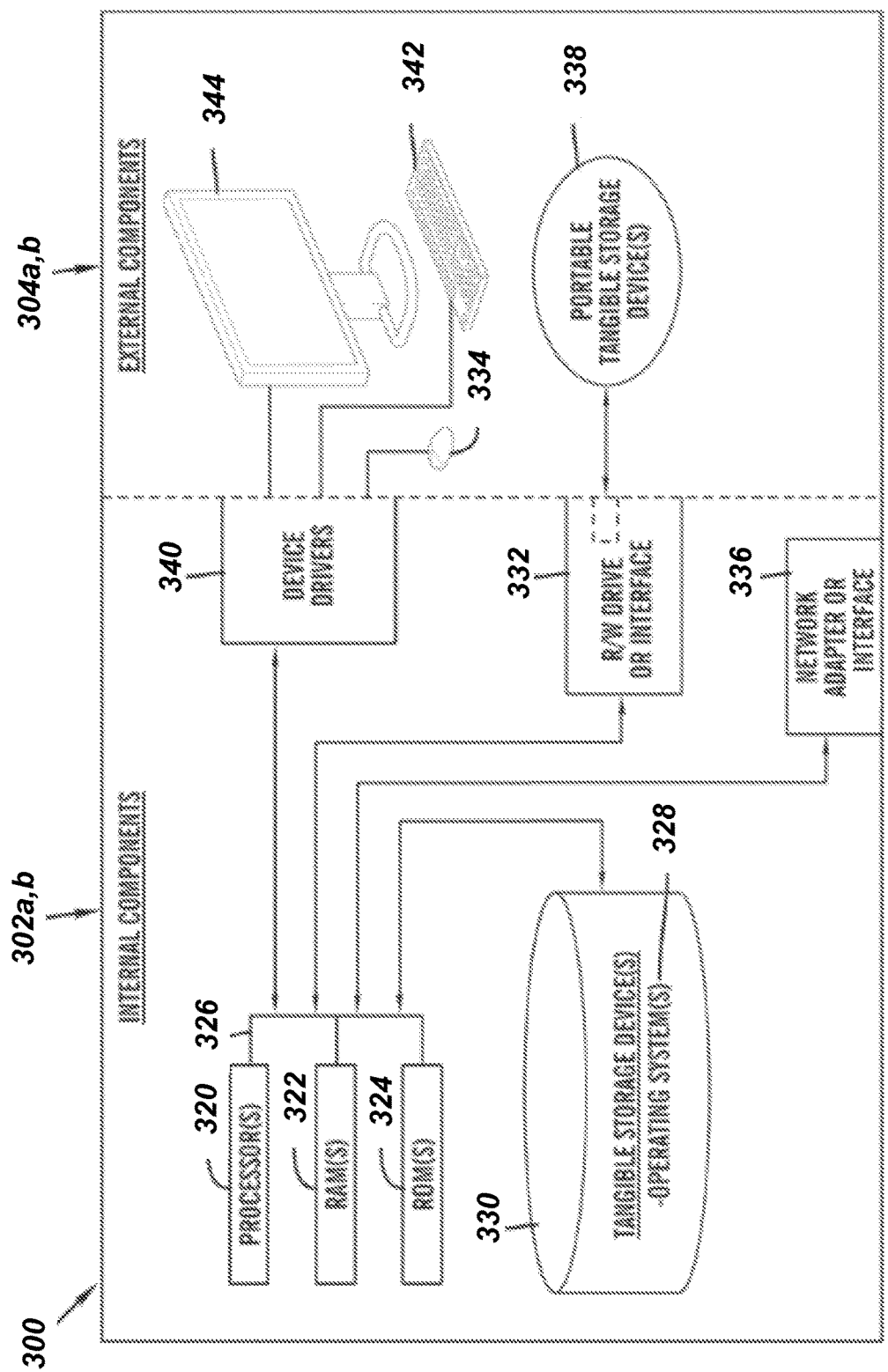
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the driverless vehicle navigation program 110A in the client computing device 102, and the driverless vehicle navigation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the driverless vehicle navigation program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The driverless vehicle navigation program 110A in the client computing device 102 and the driverless vehicle navigation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the driverless vehicle navigation program 110A in the client computing device 102 and the driverless vehicle navigation program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
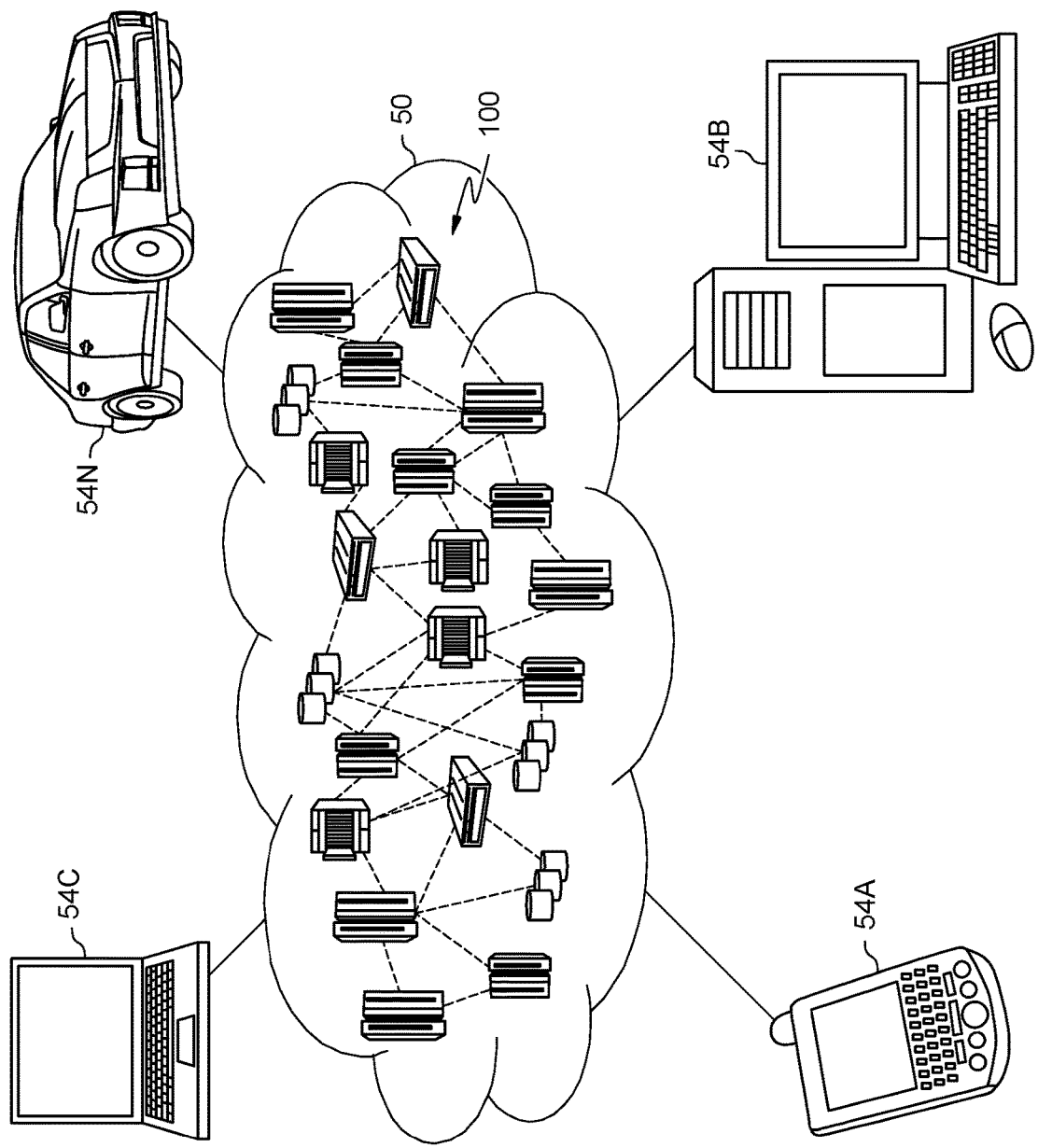
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
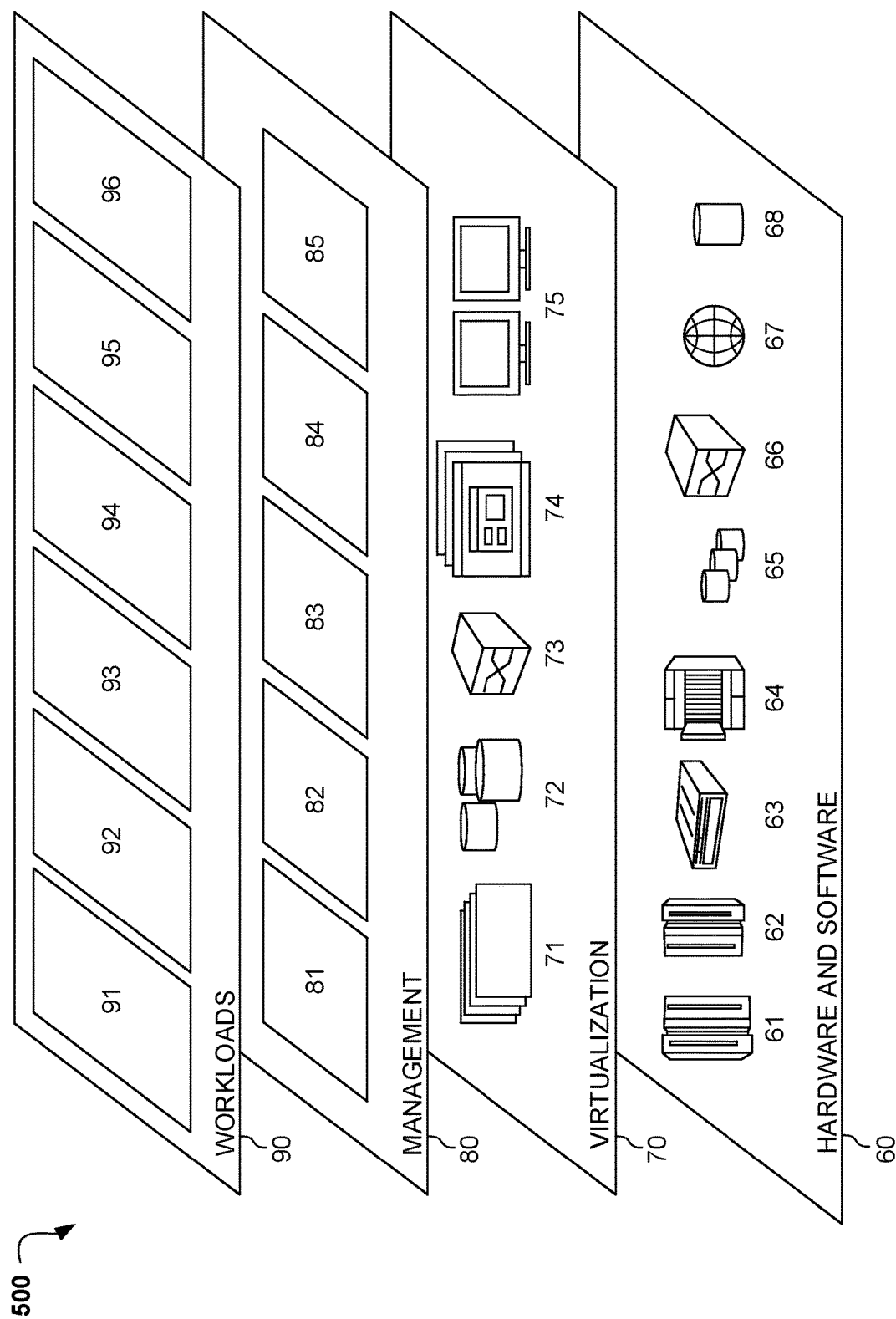
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and driverless vehicle navigation 96. Driverless vehicle navigation 96 may relate to scheduling and executing tasks for a driverless vehicle, such as charging and maintenance, during intervals when a user is least likely to have need of the driverless vehicle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    quantifying an availability risk associated with one or more predicted events on a user's schedule, wherein quantifying the availability risk comprises utilizing a data normalization function to generate a normalized time-based location matrix of the user's planned destinations based on real-time GPS location data;
    predicting a next fueling time and location of a driverless vehicle based on a battery threshold of the driverless vehicle;
    finding an availability window for scheduling each of the one or more predicted events on the user's schedule, wherein the scheduling is based at least on the availability risk and a buffer time that is based on environmental data, wherein the environmental data comprises traffic data and weather data;
    navigating the driverless vehicle based on scheduling at least one time to perform at least one predicted task, wherein the performing includes automatically returning to the location from which the driverless vehicle departed;
    comparing parking and energy costs to pick a best parking location when arriving at or returning from a task; and
    receiving user feedback to assess and refine accuracy of future availability risk calculations, together with task predicting and scheduling.

2. The method of claim 1, wherein the availability risk is a likelihood that the user will need to use the driverless vehicle at a given time.

3. The method of claim 1, wherein the availability risk is quantified based on prompting the user for information regarding when the user expects to use the driverless vehicle.

4. The method of claim 1, wherein the availability risk is assigned to one or more of the one or more events occurring within a window of time within which the driverless vehicle will require servicing or refueling.

5. The method of claim 1, wherein the buffer time comprises a time before the driverless vehicle departs to complete the predicted task or after the predicted task is completed.

6. The method of claim 1, further comprising:
    inferring the presence of one or more unscheduled events based on one or more past trends in the location of the driverless vehicle.

7. A computer system the computer system comprising:
    one or more driverless vehicles, one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    quantifying an availability risk associated with one or more predicted events on a user's schedule, wherein quantifying the availability risk comprises utilizing a data normalization function to generate a normalized time-based location matrix of the user's planned destinations based on real-time GPS location data;
    predicting a next fueling time and location of a driverless vehicle based on a battery threshold of the driverless vehicle;
    finding an availability window for scheduling each of the one or more predicted events on the user's schedule, wherein the scheduling is based at least on the availability risk and a buffer time that is based on environmental data, wherein the environmental data comprises traffic data and weather data; and
    navigating the driverless vehicle based on scheduling at least one time to perform at least one predicted task, wherein the performing includes automatically returning to the location from which the driverless vehicle departed;
    comparing parking and energy costs to pick a best parking location when arriving at or returning from a task; and
    receiving user feedback to assess and refine accuracy of future availability risk calculations, together with task predicting and scheduling.

8. The computer system of claim 7, wherein the availability risk is a likelihood that the user will need to use the driverless vehicle at a given time.

9. The computer system of claim 7, wherein the availability risk is quantified based on prompting the user for information regarding when the user expects to use the driverless vehicle.

10. The computer system of claim 7, wherein the availability risk is assigned to one or more of the one or more events occurring within a window of time within which the driverless vehicle will require servicing or refueling.

11. The computer system of claim 7, wherein the buffer time comprises a time before the driverless vehicle departs to complete the predicted task or after the predicted task is completed.

12. The computer system of claim 7, further comprising:
    inferring the presence of one or more unscheduled events based on one or more past trends in the location of the driverless vehicle.

13. A computer program product, the computer program product comprising:
    one or more computer-readable tangible storage medium and program instructions stored on at least one of the one or more tangible storage medium, the program instructions executable by a processor to cause the processor to perform a method comprising:
    quantifying an availability risk associated with one or more predicted events on a user's schedule, wherein quantifying the availability risk comprises utilizing a data normalization function to generate a normalized time-based location matrix of the user's planned destinations based on real-time GPS location data;
    predicting a next fueling time and location of a driverless vehicle based on a battery threshold of the driverless vehicle;

finding an availability window for scheduling each of the one or more predicted events on the user's schedule, wherein the scheduling is based at least on the availability risk and a buffer time that is based on environmental data, wherein the environmental data comprises traffic data and weather data; and navigating the driverless vehicle based on scheduling at least one time to perform at least one predicted task, wherein the performing includes automatically returning to the location from which the at least one the driverless vehicle departed;

comparing parking and energy costs to pick a best parking location when arriving at or returning from a task; and receiving user feedback to assess and refine accuracy of future availability risk calculations, together with task predicting and scheduling.

14. The computer program product of claim 13, wherein the availability risk is a likelihood that the user will need to use the driverless vehicle at a given time.

15. The computer program product of claim 13, wherein the availability risk is quantified based on prompting the user for information regarding when the user expects to use the driverless vehicle.

16. The computer program product of claim 13, wherein the availability risk is assigned to one or more of the one or more events occurring within a window of time within which the driverless vehicle will require servicing or refueling.

17. The computer program product of claim 13, wherein the buffer time comprises a time before the driverless vehicle departs to complete the predicted task or after the predicted task is completed.

18. The computer program product of claim 13, further comprising:

inferring the presence of one or more unscheduled events based on one or more past trends in the location of the driverless vehicle.

\* \* \* \* \*